3,770,669
PROCESS FOR THE MANUFACTURE OF CELLULAR PLASTICS FROM POLYAMIDES
Eckart Reske, Hofheim, Taunus, Harald Cherdron, Naurod, Taunus, and Ludwig Brinkmann and Walter Herwig, Frankfurt am Main, Germany, assignors to Farbwerke Hoechst Aktiengesellschaft vormals Meister Lucius & Bruning, Frankfurt am Main, Germany
No Drawing. Filed Apr. 14, 1972, Ser. No. 244,282
Claims priority, application Germany, Apr. 16, 1971, P 21 18 509.1
Int. Cl. C08g 53/08
U.S. Cl. 260—2.5 D                8 Claims

ABSTRACT OF THE DISCLOSURE

There is disclosed and claimed a process for the production of cellular plastics from polyamides, which exhibit melting ranges near to or above their decomposition temperatures or poor or no solubility at all in solvents or which exhibit both of these properties at the same time, the process which comprises processing polyamides carrying substituents at the amide nitrogen, from the melt or from the solution and splitting-off partially or totally the N-substituents to yield cellular plastics by the foaming action of the unsaturated compounds which originate from the N-substituents during the splitting-off process. This foaming action is augmented by additionally using foaming or expanding agents and/or reducing the pressure during the splitting-off process.

The present invention relates to a process for the manufacture of cellular plastics from polyamides.

Numerous polyamides which, in principle, can be prepared according to known methods could not yet be processed to yield cellular plastics despite the fact that they have sufficient thermal stability.

The melting ranges of these polyamides come often near to, or are about their decomposition temperature. On the other hand, polyamides of this kind are in most cases insoluble in solvents which would allow for a processing to yield cellular plastics.

It is known that the intermolecular forces which are responsible for the high melting points and consequently for the insolubility can be reduced by introducing substituents into the polyamide chains, particularly at the amide nitrogen, in order to reduce the melting range and to increase the solubility of the polyamide.

However, due to their low melting ranges, these substituted polyamides are not appropriate for the production of heat-resistant cellular plastics. Moreover, in many applications of the products, there is required stability to solvents.

Now, a process has been found to produce cellular plastics from polyamides which are high-melting or which are sparingly soluble or insoluble in solvents or which exhibit these properties at the same time, which comprises processing polyamides being substituted at the amide nitrogen, from the melt or the solution to yield cellular plastics, optionally in the presence of foaming agents, and additives such as fillers and dyestuffs or plasticizers and separating (splitting-off) in part or totally the N-substituents of the polyamides during foaming, after foaming or during and after foaming.

In the process according to the invention, polyamides are used which are partially or totally substituted at the amide nitrogen.

Aliphatic or aromatic-aliphatic hydrocarbon radicals, particularly alkyl or cyclo-alkyl groups having 2 to 12, preferably 2 to 8 carbon atoms, and aralkyl groups having 7 to 20 carbon atoms, preferably 7 to 12 carbon atoms, which can be thermally split-off as unsaturated hydrocarbons, are suitable substituents for the amide hydrogen. Particularly advantageous are the n- and i-propyl and the i- and tertiary butyl groups. Mixtures of two or more of the above alkyl-, cycloalkyl-, and aralkyl groups may also serve as substituents.

Generally, it is necessary to use polyamides in which at least 10% of the amide hydrogen is replaced by substituents in order to sufficiently decrease the melting range or to increase the solubility of the polyamide, a substitution degree of from 50 to 100% being preferred.

For the preparation of the polyamides according to the invention, there are advantageously employed the below-mentioned diamines, amino-carboxylic acids and dicarboxylic acids, as well as diamines and amino-carboxylic acids carrying N-substituents as described above by way of example. It is also possible to employ mixtures of two or more compounds of these substance groups, and instead of the amino-carboxylic acids and dicarboxylic acids, there may be utilized their amide-forming derivatives, such as, for example the acid halides.

The preparation of the N-substituted polyamides can be realized according to the usual processes from N-substituted diamines and dicarboxylic acids (or the derivatives thereof, for example acid chlorides) and/or from N-substituted amino-acids (or their derivatives).

Any desired substitution degree may be obtained by copolycondensation of N-substituted amines and the corresponding unsubstituted amino compounds with dicarboxylic acids (or their derivatives) or of N-substituted amino carboxylic acids with the corresponding unsubstituted aminocarboxylic acids.

Polyamides prepared according to the invention are particularly those which have a melting range in the vicinity of their decomposition temperatures or there above and/or which are sparingly soluble or which are not soluble at all in solvents. First of all, they are principally polyamides obtained from (a) aromatic and/or aromatic-aliphatic diamines and aromatic dicarboxylic acids (optionally with the addition of aminocarboxylic acids), or
(b) aromatic and/or aromatic-aliphatic aminocarboxylic acids, or
(c) aliphatic and/or cyclo-aliphatic diamines and aromatic dicarboxylic acids (optionally with the addition of aminocarboxylic acids), or
(d) aromatic and/or aromatic-aliphatic diamines and aliphatic dicarboxylic acids (optionally with the addition of aminocarboxylic acids), or
(e) cycloaliphatic diamines and cycloaliphatic dicarboxylic acids (optionally with the addition of aminocarboxylic acids).

They may also be copolyamides from polyamides indicated sub (a) to (e).

From among the compounds indicated sub (a) to (e) the following substances are mentioned by way of example:

Aromatic diamines having 6 to 20 carbon atoms, for example m- and p-phenylene-diamine, 4,4'-, 3,4'- and 3.3'-diaminodiphenyl and other diaminodiphenyls and diamines of the general formula

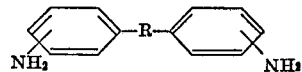

wherein R represents a bivalent radical, such as alkylene, arylene, —O—, —S—, —SO—, —SO$_2$—, —CO—, —CONH—, —R'—O—R'— (R'=identical or different alkylene or arylene radicals);

Aromatic-aliphatic diamines having 7 to 20 carbon atoms of the general formula

wherein R″ represents a single chemical bond, or identical or different alkylene groups having 1 to 8 carbon atoms and Ar represents a bivalent aromatic radical which may be substituted, such as m- and p-xylylene diamine, 2,5-dimethyl-p-xylylene diamine and 2,4-dimethyl-m-xylylene diamine;

Aliphatic and cyclo-aliphatic diamines having 2 to 20 carbon atoms, such as compounds of the general formula

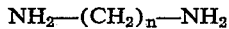

$n=2$ to 10, cis-1,3-, cis-1,4-, trans-1,3-, trans-1,4-, trans-1,2 - bisaminomethyl - cyclohexanes, trans-1,2-, cis-1,3-, trans-1,3-bis-aminomethyl-cyclopentanes and trans-1,2-bis-aminomethyl-cyclo-butane;

Aromatic dicarboxylic acids having 7 to 20 carbon atoms, such as terephthalic acid, isophthalic acid, 3,5-pyridine-dicarboxylic acid, 1,4- and 1,5-naphthalene-dicarboxylic acid and other naphthalene-di-carboxylic acids, 4,4′-diphenyl-dicarboxylic acid and dicarboxylic acids of the formula

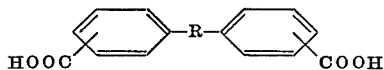

wherein R represents a bivalent radical, such as alkylene, arylene, —O—, —S—, —SO—, —SO$_2$—, —CO—, —CONH—, —R′—O—R′— (R′=identical or different alkylene or arylene radicals);

Aliphatic and cyclo-aliphatic dicarboxylic acids having 2 to 20 carbon atoms, such as compounds of the general formula

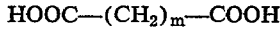

($m=0$ to 10), cis-1,3- and trans -1,3-cyclopentane-dicarboxylic acid, trans-1,2-, cis-1,3-, trans-1,3-, cis-1,4-, trans-1,4-cyclohexane-dicarboxylic acids, 4,4′-dicyclohexyl-dicarboxylic acid;

Aminocarboxylic acids having 2 to 20 carbon atoms such as compounds of the general formula

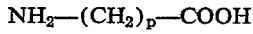

($p=1$ to 11), aminopivalic acid, m- and p-aminobenzoic acid, and aminocarboxylic acids of the formula

wherein R‴ represents a single chemical bond or an alkylene group having 1 to 8 carbon atoms and Ar represents a bivalent aromatic radical which may be substituted.

The N-substituted polyamides are for example prepared by melting stoichiometric or almost stoichiometric amounts of the concerned diamines and dicarboxylic acids, optionally with the addition of N-substituted aminocarboxylic acids or salts from the components or N-substituted aminocarboxylic acids at temperatures of from 200 to 300° C. under the pressure which constitutes itself on account of the elevated temperature and with the exclusion of oxygen, whereupon the melt is maintained at this temperature for some time, the excess pressure is slowly diminished, then the melt is heated for some time to 200 to 300° C. in an inert gas current, the pressure is then gradually reduced and condensation is continued for some time under reduced pressure at 200 to 300° C.

During the preparation of the N-substituted polyamides, it is necessary to maintain conditions under which the N-substituents will not yet be split-off. It is surprising that polyamides can be prepared at relatively low temperatures (e.g. 230 to 240° C.) and under reduced pressure by means of the condensation in the melt even from strongly sterically hindered diamines (e.g. N,N′-di-tertiary-butyl-diamines) and dicarboxylic acids; i.e., under conditions where the polycondensation in general, is proceeding very slowly.

When the melting point of the salt from the concerned diamine and the dicarboxylic acid, comes near to a temperature at which the N-substituents will already be separated very quickly, it is convenient to adopt the method of the solvent condensation of diamines and dicarboxylic acid halides. In this case, dicarboxylic acid halides or optionally solutions thereof are added to solutions of diamines, optionally in the presence of a hydrogen halide acceptor, for example, of a tertiary amine, at temperatures of from —50° to 100° C.

Appropriate solvents are for example, aprotic solvents such as dimethylformamide, dimethylacetamide, N-methylpyrrolidone or chlorinated hydrocarbons. Interfacial condensation may also be practised provided that the diamine is sufficiently water-soluble.

The splitting-off of the N-substituents occurs thermally at temperatures above 150° C., preferably above 200° C., and below the decomposition temperatures of the final products (foamed polyamides). Splitting-off may also be catalyzed, for example with the addition of salts of weak bases with strong acids, for example pyridine hydrochloride. Splitting-off can be effected more or less partially or totally.

By suitable selection of the substituents at the amide nitrogen and appropriate conditions during their splitting-off, the polymer chains are not notably degraded. On selecting, e.g., a linear diamine, such as hexamethylene diamine, for the synthesis of the polyamide chain, branched alkyl groups are introduced as N-substituents, such as the iso-propyl group, the isobutyl group or the tertiary butyl group. In the case of polyamides from aromatic diamines, such as m-phenylene diamine or from aromatic-aliphatic diamines, such as xylylene diamines or from branched diamines, for example, of the neopentyl type

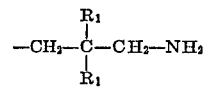

($R_1$=identical or different, monovalent, aliphatic, cyclo-aliphatic or aromatic radicals), normal alkyl groups may also be employed as substituents.

The conditions for splitting-off the substituents are dependent on the nature of the substituents and on the polyamide as well as on the shape the final product has to present.

Branched alkyl groups can be split-off in the easiest way, whereas n-alkyl groups need more rigorous conditions. While the tertiary butyl group can be split-off at temperatures of from 200 to 300° C., the isopropyl, or isobutyl group require temperatures above 300° C., and for splitting-off the n-alkyl groups temperatures above 350° C. are needed.

Due to their lower melting ranges and/or better solubility in solvents—as compared with the unsubstituted polyamides—the N-substituted polyamides can be easily moulded from the melt or from solutions (for example, in dimethyl-formamide, chloroform, acetone or methanol, according to the solubility of the polyamide).

In order to produce cellular plastics, N-substituted polyamides are heated to temperatures above the minimum temperatures necessary for splitting-off the N-substituents. The unsaturated compounds which originate from the N-substituents during this splitting-off process effect a foaming of the polyamide melt which during this process is converted into a high-melting, insoluble, foamed polyamide. The process of foaming may be intensified by reducing the pressure during the splitting-off process.

It is also feasible to add highly volatile foaming agents, such as normal or branched, low molecular weight halogenated hydrocarbons, for example $CFCl_3$, $CF_2Cl_2$, $CHCl_3$, $C_2F_4Cl_2$, $C_2F_5Cl$, optionally under pressure and to effect pressure-release during the splitting-off of the N-substituents. Expanding agents which decompose with the formation of gases can also be used, for example tri-hydrazinetriazines, barium-azo-dicarboxylate or 3,12 - di-tert.butyoxy - 2,4,11,13 - tetraoxa-3,12-diphosphadispiro-[5,2,5,2]-hexadecane. Further, cellular plastics can be produced from N-substituted polyamides by means of foaming agents, which then for splitting-off the N-substituents are quickly heated to temperatures above the minimum temperatures necessary for the splitting-off process.

The manufacture of the heat-resistant cellular plastics from polyamides can be realized directly in the mold. On injecting, for example, the N-substituted polyamide into a hot mold the temperature of which is sufficiently high for the substituents to be split-off, the polyamide will foam and the cellular plastic will completely fill the mold. The solid polyamide or the melt may as well be filled into a mold which then is heated-up.

Cellular sheets from polyamides are obtained by moulding N-substituted polyamides for example by extrusion to yield sheets and allowing these sheets to foam at temperatures which are sufficiently high for splitting-off the substituents. In analogy to this, it is possible to produce profiles from polyamide cellular plastics.

Laminates are obtained, when N-substituted polyamides are allowed to foam according to the invention on a suitable support, such as high-temperature-resistant plastics material, metal or glass, optionally with the addition of an adhesive agent, or between these materials.

When the N-substituents are split-off during the molding process, with foam formation, care has to be taken that the pressure and the temperature conditions are chosen in such a way to make sure that the duration of molding is identical or even shorter than the time for splitting-off the N-substituents.

For the manufacture of the cellular plastics according to the invention, there can be employed pure N-substituted polyamides, it is however, possible to add substances such as fillers, dyestuffs and plasticizers.

The finished product (foamed polyamide) shows a higher melting range, a higher second order transition temperature or lower solubility, or it exhibits these properties at the same time. When the N-substituents are split-off totally, the finished product exhibits the properties of the unsubstituted polyamide.

The following examples illustrate the invention.

EXAMPLES

All reduced specific viscosities have been determined on solutions of 1 g. of polyamide in 100 ml. of phenol/tetrachloroethane (in a weight ratio of 60:40) at 25° C.

(1a) Condensation of N,N'-di-tertiary-butyl-p-xylylene diamine with isophthaloyl chloride 4.968 g. of N,N'-di-tertiary-butyl-p-xylylene diamine and 4.2 g. of triethylamine were reacted at 20° C. in 50 ml. of dimethylformamide with 4.061 g. of isophthaloyl chloride. The reaction mixture was poured into water. Then the polyamide was suction-filtered, washed until it was free of chloride and dried.

The polyamide showed a reduced specific viscosity of 1.03 dl./g. and was soluble in solvents such as chloroform, acetone, dimethyl-formamide, and dimethylacetamide.

(b) Splitting-off isobutylene from the polyamide

The polyamide according to Example 1a was melted in a glass tube at 200° C. under nitrogen and then heated to 270° C. Within some minutes, a cellular plastic originated which decomposed above 350° C. and which was insoluble in phenol-tetrachlorethane.

(2a) Condensation of N,N'-di-tertiary-butyl-p-xylylene diamine with adipic acid

In order to obtain the salt, solutions of 24.842 g. of N,N'-di-tertiary-butyl-p-xylylene diamine and of 14.615 g. of adipic acid respectively in methanol were poured together. The precipitated salt was suction-filtered, dissolved in water, precipitated with acetone, suction-filtered and dried.

The salt was then melted in a flask at 240° C. under nitrogen and it was maintained at this temperature during 2 hours in a nitrogen current. Then it was evacuated slowly to a pressure of 0.05 torr and condensation was continued during 4 hours at a temperature of from 230 to 240° C. The polyamide obtained exhibited a reduced specific viscosity of 1.2 dl./g. and was soluble in solvents such as chloroform and dimethyl formamide.

(b) Splitting-off isobutylene from the polyamide

The polyamide according to Example 2a was melted at 200° C. in a glass tube under nitrogen and then heated to 300° C. Within some minutes, a polyamide cellular plastic originated which changed color above 350° C. and which was insoluble in solvents, such as dimethyl-formamide or phenol-tetrachlorethane.

(3a) Condensation of N,N'-di-isopropyl-hexamethylene diamine with terephthalic acid In order to obtain the salt, 20.037 g. of N,N'-di-isopropyl-hexamethylene diamine and 16.614 g. of terephthalic acid were boiled in 250 ml. of ethanol for 1 hour. After elimination of the solvent, the salt was dissolved in water and precipitated with iso-propanol.

The dried salt was polycondensed in a glass flask at 280° C., under nitrogen as described in Example 2a. The polyamide obtained showed a reduced specific viscosity of 1.6 dl./g. and was soluble in solvents, such as methanol and dimethyl formamide.

(b) Splitting-off propylene from the polyamide

A sample of the polyamide according to Example 3a was heated to 355° C. in a glass tube under nitrogen and yielded a polyamide cellular plastic which was no longer soluble in phenol-tetrachlorethane.

(4a) Condensation of N,N'-di-isobutyl-ethylene diamine with terephthalic acid 17.232 g. of N,N'-di-isobutyl-ethylene diamine and 16.614 g. of terephthalic acid were dissolved in ethanol. After elimination of the solvent, polycondensation was carried out at 260° C. as described in Example 2.

The polyamide exhibited a reduced specific viscosity of 1.1 dl./g. and was soluble in solvents such as dimethylformamide and methanol.

(b) Splitting-off isobutylene from the polyamide

A sample of the polyamide according to Example 4a was melted in a glass tube at 260° C., under nitrogen and heated to 350° C. Within several minutes, a polyamide cellular plastic was obtained which was insoluble in solvents.

(5a) Condensation of N,N'-di-isobutyl-m-phenylene diamine with isophthaloyl chloride 22.036 g. of N,N'-di-isobutyl-m-phenylene diamine and 20.5 g. of triethyl amine were reacted at 0° C. in 200 ml. of dimethyl formamide with 20.303 g. of isophthaloyl chloride. Then, the reaction mixture was poured into water and the polyamide was suction-filtered, washed until it was free of chloride and then dried. It showed a reduced specific viscosity of 1.3 dl./g. and was soluble in solvents such as dimethyl formamide and dimethylacetamide.

(b) Splitting-off isobutylene from the polyamide

A sample of the polyamide according to Example 5a was melted in a glass tube under nitrogen and heated to 380° C. A polyamide cellular plastic was obtained which was insoluble in solvents.

(6a) Condensation of N,N'-di-tert-butyl-p-xylylene diamine and p-xylylene diamine with adipic acid 12.421 g. of N,N'-di-tert.-butyl-p-xylylene diamine and 6.810 g. of p-xylylene diamine were dissolved in methanol. After adding 14.615 g. of adipic acid the whole was boiled for ½ hour and the solvent was eliminated. The residue was melted and condensed as described in Example 2a. The polyamide obtained exhibited a reduced specific viscosity of 0.9 dl./g.

(b) Splitting-off isobutylene from the polyamide with the addition of a foaming agent 2 g. of the polyamide according to Example 6a were finely comminuted and thoroughly mixed with 0.1 g. of 3,12 - di-tert.-butoxy-2,4,11,13-tetraoxa-3,12-diphosphadispiro-[5,2,5,2]-hexadecane and 0.005 g. of tri-ethylamine. After melting the whole was heated to 280° C. and after 15 minutes to 300° C. A cellular plastic was obtained which was insoluble in solvents.

We claim:

1. A process for the production of cellular plastics from polyamide having recurring carbonamide groups as an integral part of the linear polymeric chain which comprises treating, in melt or solution, polyamide which is N-substituted having at least 10% of the hydrogen in the amide nitrogen replaced by aliphatic or aromatic-aliphatic hydrocarbon moieties of 2 to 12 carbon atoms or mixtures thereof, by thermally suplitting-off as unsaturated compounds partially or totally the N-substituents, and recovering cellular plastics formed by foaming action of said unsaturated compounds originating from said N-substituent moieties during the splitting-off process.

2. The process according to claim 1, which comprises thermally splitting-off polyamide in which at least 10% of the amide hydrogen is replaced by alkyl of 2 to 12 carbon atoms or aralkyl groups of 7 to 12 carbon atoms.

3. The process according to claim 1, which comprises thermally splitting-off polyamide in which the N-substituents are alkyl groups having 2 to 8 carbon atoms.

4. The process according to claim 1, which comprises thermally splitting-off polyamide in which the hydrogen in the amide is replaced from 50% to 100% by alkyl groups having 2 to 8 carbon atoms, said alkyl groups upon splitting-off being converted to said unsaturated compounds.

5. The process according to claim 1, which comprises thermally splitting-off polyamide in which n-propyl, i-propyl, i-butyl or tertiary butyl groups are employed as N-substituents.

6. The process according to claim 1, which comprises additionally incorporating foaming or expanding agents in said polyamide.

7. The process according to claim 1, which comprises intensifying the forming action of the split-off unsaturated compounds by reducing the pressure during the splitting-off process.

8. The process according to claim 1, which comprises incorporating fillers, dyestuffs or plasticizers as additives in said polyamide.

References Cited
UNITED STATES PATENTS

| | | | |
|---|---|---|---|
| 2,990,381 | 6/1961 | Meinel | 260—2.5 D |
| 3,001,956 | 9/1961 | Meinel | 260—2.5 D |
| 3,044,970 | 7/1962 | Baumeister et al. | 260—2.5 D |
| 3,382,195 | 5/1968 | Gilch et al. | 260—2.5 N |
| 3,679,613 | 7/1972 | Gilch et al. | 260—2.5 N |

PAUL LIEBERMAN, Primary Examiner

M. FOELAK, Assistant Examiner

U.S. Cl. X.R.

260—2.5 N, 78 SC, 78 R, 78 A, 78 L